United States Patent [19]
Barenyi

[11] 3,934,896
[45] Jan. 27, 1976

[54] STEERING ARRANGEMENT FOR MOTOR VEHICLES
[75] Inventor: Béla Barényi, Maichingen, Germany
[73] Assignee: Daimler-Benz Aktiengesellschaft, Germany
[22] Filed: Feb. 2, 1973
[21] Appl. No.: 329,094

[30] Foreign Application Priority Data
Feb. 3, 1972  Germany............................ 2205014

[52] U.S. Cl................................. 280/87 R; 74/492
[51] Int. Cl.²......................................... B62D 1/18
[58] Field of Search............. 74/492, 493; 280/87 R, 280/87 A; 180/78, 82 R

[56] References Cited
UNITED STATES PATENTS

| | | | |
|---|---|---|---|
| 2,899,214 | 8/1959 | D'Antini | 74/492 X |
| 3,028,766 | 4/1962 | Musilli | 74/493 X |
| 3,429,196 | 2/1969 | White | 74/493 |
| 3,464,284 | 9/1969 | Fergle | 74/492 |
| 3,578,782 | 5/1971 | Miyoshi | 74/492 |
| 3,627,345 | 12/1971 | LeMire | 280/87 R |
| 3,672,697 | 6/1972 | Knowles | 280/877 A |

*Primary Examiner*—Leo Friaglia
*Attorney, Agent, or Firm*—Craig & Antonelli

[57] ABSTRACT

A steering arrangement for motor vehicles, especially for passenger motor vehicles which includes a steering column constituted by an outer column secured within the area of an instrument panel and a steering spindle; the steering column portion or outer column, constructed of relatively short length, is held fast only within the area of the instrument panel and is supported within the area of the front axle of the vehicle by way of an intermediate member extending generally in the same direction and having a steeper inclination.

25 Claims, 12 Drawing Figures

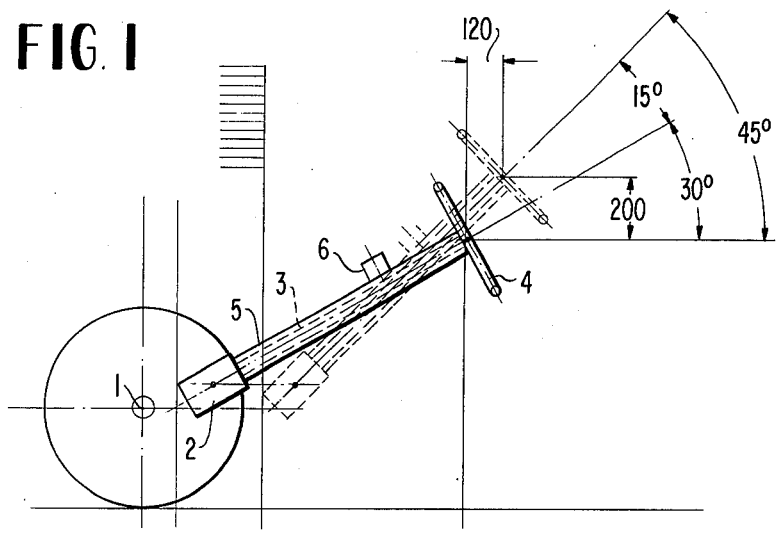
FIG. 1
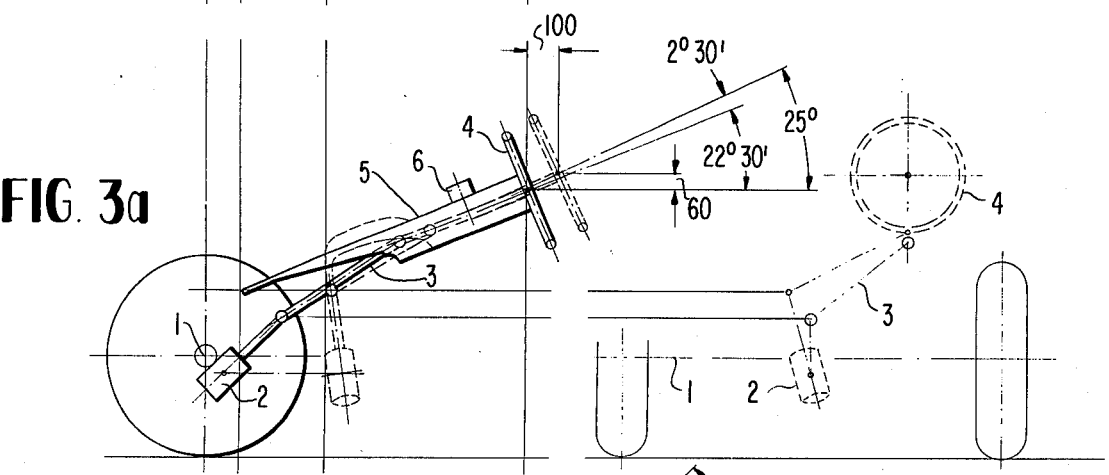
FIG. 3a
FIG. 3b
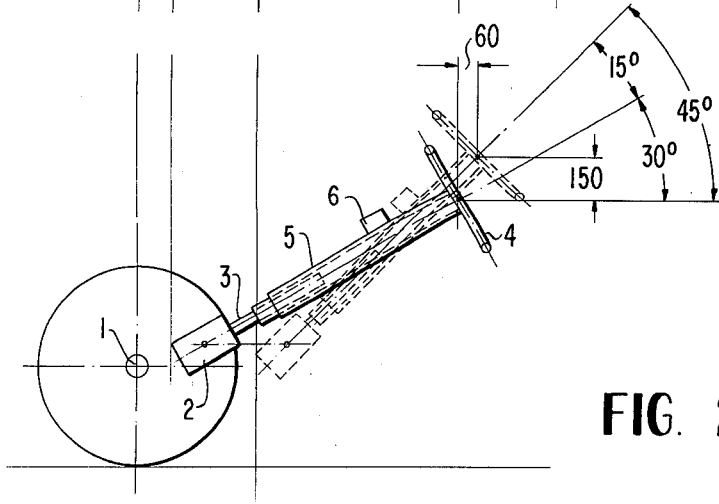
FIG. 2

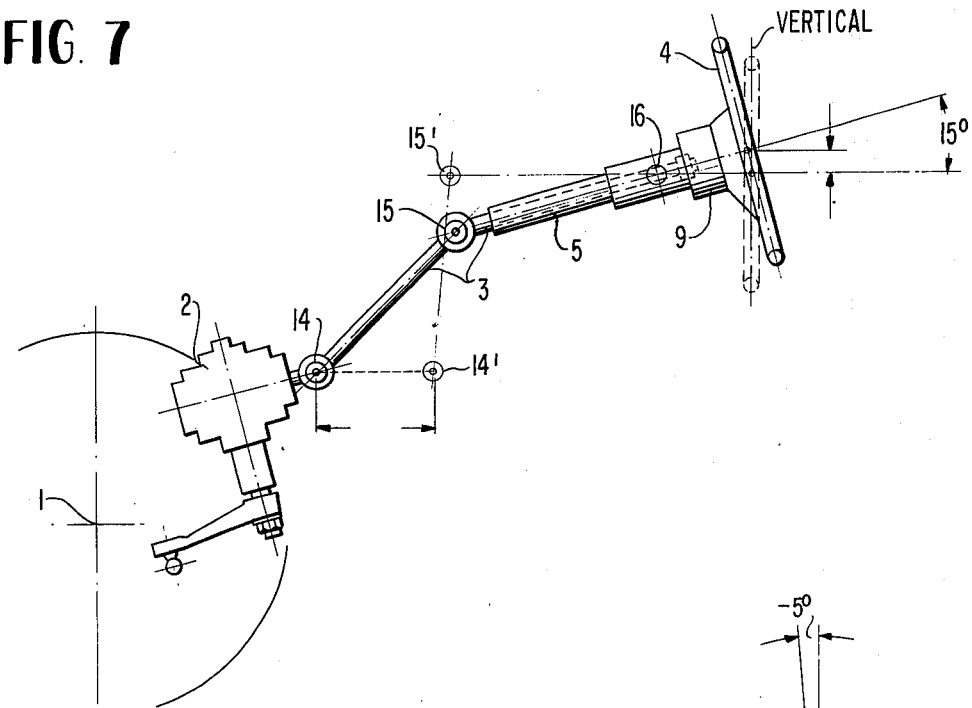
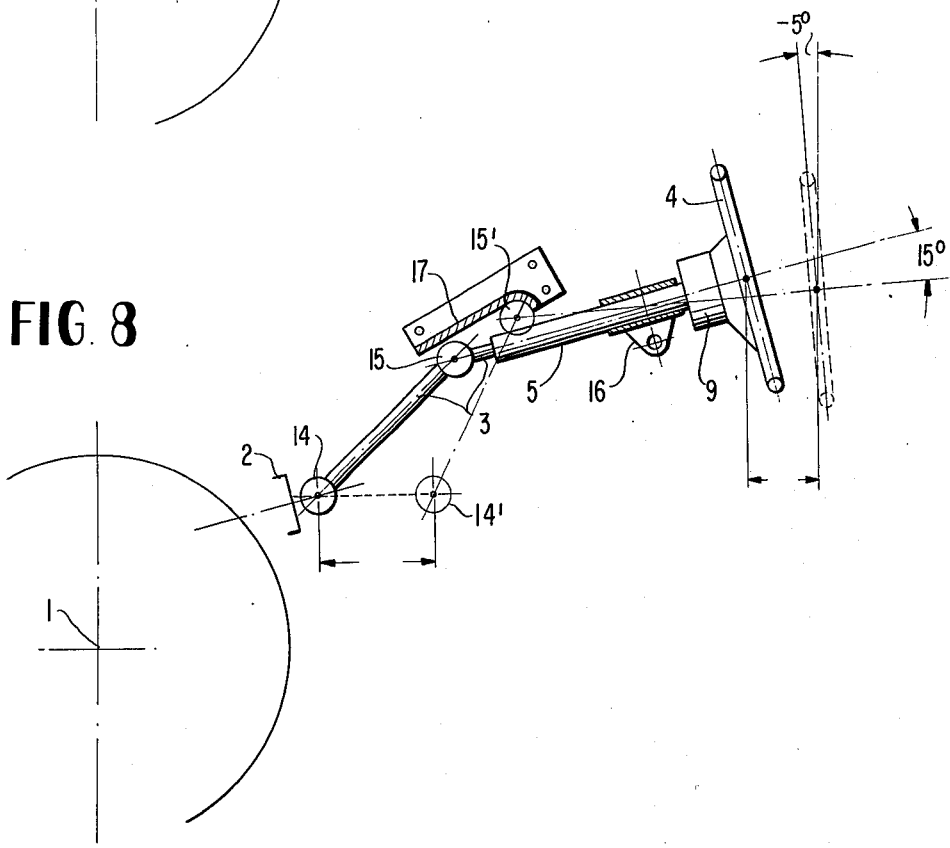

STEERING ARRANGEMENT FOR MOTOR VEHICLES

The present invention relates to a steering arrangement for motor vehicles, especially for passenger motor vehicles with a steering column formed by an outer steering column or outer casing secured within the area of the instrument panel and a steering spindle.

With the present-day steering arrangements, the steering gear which is adjoined by the steering spindle, is located preferably within an area shortly to the rear of the front axle of the vehicle. If the deformation of the vehicle in case of an accident is limited to the area in front of the front axle, then the position of the steering column and of the steering wheel is not changed. Especially if additionally also deformation elements and/or large-surfaced deformation-rigid and padded steering wheels are used, then such steering systems are held out as safety steering systems. However, even if the deformations occurring during an accident remain limited to the area in front of the front axle, such so-called safety steering arrangements do not offer any protection against injuries, because the body of the driver impinges against the steering wheel hub edge-like instead of surface-like and within the face area rather than the chest area. During serious accidents, in which also the area to the rear of the front axles are exposed and subjected to deformations, the criteria are reinforced and both the steering wheel rim as also in particular the steering wheel hub become considerable danger sources for the vehicle passengers who frequently even suffer fatal injuries by such steering arrangements during serious injuries. This is based on the fact that the steering spindles together with the steering wheels are displaced into the passenger space in the known types of prior art construction during the first phase of a collision with uncontrolled movements and, more particularly, upwardly whereby the steering columns erect themselves toward the vertical. The driver of the respective vehicle impinges thereby only during the second phase of a collision against the upwardly displaced and further erected steering column. The driver thereby impinges with body parts, especially with the head, against parts of the steering arrangement which are designed for the absorption of another force, for example, of an impact of the chest of the driver. Furthermore, with the known deformation members, a completely satisfactory functioning is also dependent essentially on the impact directly which after the erection of the steering column no longer coincides with the direction planned in the construction.

The present invention is concerned with the task to provide a steering arrangement of the aforementioned type which also in case of deformations of the vehicle, conditioned by accidents, within the area of the front axle leaves effective the operation of the additional safety devices of the steering arrangement. The present invention essentially consists in that the steering column section of short construction or the outer column is clamped or held fast only within the area of the instrument panel and is supported within the area of the front axle of the vehicle by way of at least one more steeply inclined intermediate member extending in the same direction.

It is achieved by this construction according to the present invention that a deformation within the area of the front axle causes a pivoting of the part of the steering column projecting into the passenger space, during which the steering wheel is positioned more steeply, i.e., is caused to approach the vertical with its steering wheel plane. It is assured thereby that the steering wheel comes to lie within the area in which is located the chest of the driver so that the safety devices designed for the force absorption of the chest of the driver, especially a deformation pot or the like retain their full effectiveness. As a result of the angular adjustment of the steering wheel rim toward the vertical, the impact surface is additionally enlarged so that the injury danger is further reduced. It is achieved that the very strong deformations of the front area occurring during a serious accident are not transmitted negatively into the passenger interior space by the steering arrangement but instead even lead to a positive influencing of the position of the steering wheel with respect to the impinging body.

In one simple embodiment of the present invention, provision is made that a non-guided deformation element is arranged between an upper part of the steering spindle carrying the steering wheel and a forward lower part, which non-guided deformation element in the zero position of the steering wheel has a steeper inclination than the steering column axis. It is achieved thereby that the force adapted to be transmitted in the axial direction by the unguided deformation element is introduced into the adjoining part of the steering spindle with an angular deflection so that this part is pivoted essentially only about its fastening means disposed within the area of the instrument panel but is not displaced axially or is axially displaced only slightly.

In another embodiment of the present invention, provision is made that the steering spindle is subdivided by means of joints whereby the sections of the steering spindle are disposed one behind the other in the driving direction and only the upper section carrying the steering wheel is guided in the outer steering column. Also, in this embodiment, an axial displacement of the area of the front axle is converted into a pivot movement of the outer column together with the part carrying the steering wheel whereby the plane of the steering wheel rim is turned into the vertical and its center is even somewhat lower. In order to achieve with this embodiment that the steering wheel is brought simultaneously closer to the chest of the driver, a guide rail is arranged in the realization of this embodiment above the joint of the part guided in the outer column, which guide rail has a lesser inclination than the part of the steering spindle disposed outside the outer column. This approaching of the steering wheel rim to the body of the driver and more particularly at a favorable distance and favorable angle offers the advantage that a large deformation path is made available for the dissipation of the kinetic energy of the body. This approaching of the steering wheel rim to the chest of the driver is meaningful by reason of the fact that a controlled movement is carried out by the steering wheel rim which does not leave an area predetermined by the construction.

In a further embodiment of the present invention, the outer column is pivotally connected by way of an intermediate lever to the support structure of the vehicle within the area of the front axle. The desired angular adjustment of the steering wheel rim is attained thereby independently of the construction of the steering spindle and the position of the steering gear.

Accordingly, it is an object of the present invention to provide a steering arrangement for motor vehicles, especially for passenger motor vehicles which avoids by simple means the aforementioned shortcomings and drawbacks encountered in the prior art.

Another object of the present invention resides in a safety steering arrangement for motor vehicles, especially for passenger motor vehicles which greatly improves its safety factor and remains fully effective even also in case of serious accidents affecting the area of the front vehicle section to the rear of the front axle.

A further object of the present invention resides in a safety steering arrangement for motor vehicles, especially passenger motor vehicles in which the planned direction of impact of the body of the driver as well as the particular body part expected to impinge against the steering wheel remain assured regardless of the seriousness of the accident.

A still further object of the present invention resides in a steering arrangement for motor vehicles in which the position of the steering wheel is so controlled even in case of serious injuries affecting the entire front section of the vehicle that its intended safety action as regards absorption of forces is far-reachingly preserved.

These and further objects, features, and advantages of the present invention will become more apparent from the following description when taken in connection with the accompanying drawing which shows, for purposes of illustration only, several embodiments in accordance with the present invention, and wherein:

FIGS. 1, 2, 3a, 4 and 5 are schematic side elevational views of steering arrangements known in the prior art;

FIG. 3b is a partial schematic end elevational view of the prior art steering arrangement of FIG. 3a;

FIG. 7 is a schematic side view of a modified embodiment of a steering arrangement according to the present invention;

FIG. 8 is a schematic side view of a still further modified embodiment of a steering arrangement in accordance with the present invention, similar to FIG. 7.

Figure 4:
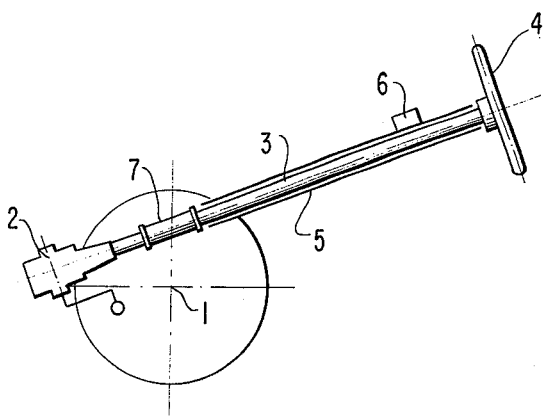

Referring now to the drawing wherein like reference numerals are used throughout the various views to designate like parts, and more particularly to FIGS. 1 to 5, in the known types of construction of the prior art, illustrated in these figures, a steering gear 2 is illustrated in each case within the area of a front axle 1 of a motor vehicle, which is connected by way of a steering spindle 3 with a steering wheel 4 disposed in the front area of the passenger space of the vehicle. The steering spindles 3 are guided at least partially in an outer steering column or casing 5 which is provided with fastening means 6 within the area of an instrument panel (not shown).

With the type of construction according to FIG. 1, the outer column 5 which completely surrounds the one-piece, continuous steering spindle 3, extends up to the steering gear 2 at which it is secured. If in a vehicle equipped with this steering arrangement, the area of the front axle 1 is affected as a result of a serious accident, then the steering gear 2 is displaced, for example, into the position illustrated in dash line. This has, as a consequence, that the steering spindle 3 together with the steering wheel 4 and the outer column 5, are displaced into the position also indicated in dash lines. The outer column 5 together with the steering spindle 3 is thereby displaced further inwardly and upwardly into the passenger space whereby the steering column formed by the steering spindle 3 and the outer casing or column 5 is erected or set up. It is clearly visible that the steering wheel 4 is located after this deformation occurring during the first phase of an accident in an area which completely deviates from the normal position and which lies far too high and additionally opposes a sharp edge to the impinging body of the driver. These deformations are frequently of such magnitude that the steering wheel 4 and its hub are located within the area in which the driver impinges with his neck or head when he is thrown forwardly during the second accident phase.

The type of construction according to FIG. 2 differs from the type of construction according to FIG. 1 in that the steering spindle 3 consists of at least two telescope-like parts adapted to be telescoped one within the other. However, as is indicated in dash lines in FIG. 2, the basic deformation and displacement of the steering column changes only slightly in case of an accident affecting the area of the front axle 1 so that the disadvantages which exist with the type of construction according to FIG. 1 cannot be avoided.

In the type of construction illustrated in FIGS. 3a and 3b, there is provided a steering spindle 3 which is subdivided into several parts by means of joints, whereby the portion adjoining the steering gear 2 has the steepest inclination and the part carrying the steering wheel 4 the weakest inclination. As can be seen from FIG. 3b, the steering gear 2 is disposed approximately in the vehicle center whereas the steering wheel 4 is arranged offset toward the side of the vehicle. The joints of the steering spindle 3 therefore lie mutually offset in the driving direction. The outer column 5 accommodates in this prior art type of construction only the upper portion of the steering spindle 3 whereas it extends up to within the area of the front axle 1 and is secured once more within this area. With this type of construction, the erecting movement of the steering column is admittedly avoided far-reachingly, however, in case of a serious accident, the steering spindle 3 together with the steering wheel 4 is displaced obliquely upwardly as indicated in dash line in FIG. 3a. The steering wheel 4 therefore leaves also with this type of construction the area in which the chest of the driver of the respective vehicle would impinge during an accident. Consequently, essentially the same difficulties ensue as with the types of constructions according to FIGS. 1 and 2.

In the type of construction according to FIG. 4, the steering gear 2 is located in front of the front axle 1 of a vehicle. The steering spindle 3 is subdivided with the aid of a deformation member 7 or of a joint, a so-called interrupt coupling or a similar element, whereas the outer column 5 extends from the area of the front axle 1 up to into the passenger interior space to the steering wheel 4. By reason of the extremely long outer column 5 essentially the same deformations result as with the types of construction according to FIGS. 1 and 2 so that also with this embodiment an increased injury danger is caused by the steering arrangement in case of serious injuries, even if a so-called interrupt coupling is arranged at 7.

Figure 5:
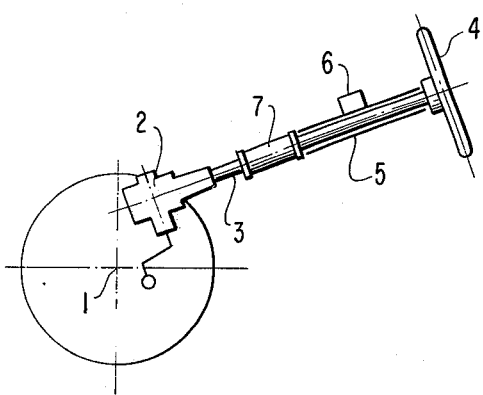

In the type of construction according to FIG. 5, the steering gear 2 is located above and to the rear of the front axle 1 of a motor vehicle. The associated steering spindle 3 includes a deformation element 7 which is surrounded in its upper area by a short outer column 5. This type of construction advantageously differs from the type of construction according to FIGS. 1 to 4 in that with a correct design and construction of the deformation member 7 a displacement of the upper portion of the steering spindle 3 can be prevented far-reachingly and even completely under certain circumstances. However, it is prerequisite therefor that the deformation member 7 is also unguided radially, i.e., not be guided in the radial direction, so that it can also deform in this direction and does not lead to an erection of the steering spindle 3 by the forces transmitted thereby. This, however, is the case when the parts of the steering spindle 3 are guided telescopically one within the other under omission of the deformation member 7.

Figure 6:
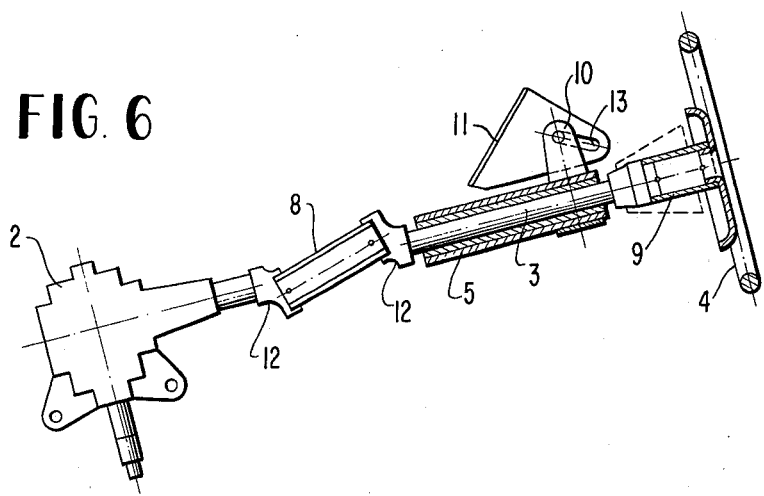
FIG. 6 is a schematic side view of one embodiment of a steering arrangement in accordance with the present invention.

The embodiment illustrated in FIG. 6 according to the present invention starts essentially with the type of construction according to FIG. 5. In the embodiment according to FIG. 6 a non-guided deformation member 8 is also provided between a steering gear 2 and an upper portion of a steering spindle 3; the deformation member 8 is thereby not guided, is as long as possible, is plastically yielding and is strong in torsion but weak in buckling. The upper portion of the steering spindle 3 is connected with the steering wheel 4 by way of an impact pot 9; the steering wheel 4 is at least in its lower area more form-rigid than the impact pot 9 by conventional means (not shown). The upper portion of the steering spindle 3 is guided by a very short outer column 5 which is secured and rotatably supported at a mounting or support means 11 within the area of the instrument panel of the vehicle by means of a joint 10 having a horizontal axis disposed transversely to the driving direction.

The deformation member 8 is arranged with an inclination to the steering column axis in that it is arranged at an inclination to this axis between two eccentric, slightly obliquely inclined mounting means 12. The inclination is so selected that the deformation member 8 has in the illustrated zero position of the steering wheel 4, i.e., in the position for straight drive, a more steep inclination that the steering column axis. It is achieved in this manner that the forces transmitted in case of a frontal impact from the steering gear 2 onto the steering spindle 3 act as a moment about the joint 10 so that the outer column 5 together with the part of the steering spindle 3 guided therein is pivoted in the clockwise direction whereby the plane of the steering wheel 4 is pivoted toward the vertical. The joint of the mounting means 10 which may be in the form of a bracket or the like, is guided in a slot guidance 13 falling off in the direction toward the vehicle interior space so that also a displacement of the steering wheel 4 toward the chest of the driver is undertaken.

In the embodiment according to FIG. 7, a steering gear 2 is arranged within the area to the rear of the front axle 1 of a vehicle. This steering gear 2 is connected by way of a steering spindle 3 subdivided by means of joints 14 and 15 with a steering wheel 4 disposed in the passenger space. The upper portion of the steering spindle 3 which carries the steering wheel 4 is guided in a very short outer column 5 which is secured at a cross bearer (not shown) within the area of the instrument panel of the vehicle by way of a mounting means 16 having a horizontal axis disposed transversely to the driving direction. The joints 14 and 15, as also the parts of the steering spindle 3, are disposed in a common vertical plane extending in the driving direction. The portion of the steering spindle 3 adjoining the steering gear 2 thereby has a steeper inclination than the following portion which is inclined approximately at an angle of about 15° to the horizontal. This angle is considered in practice as advantageous for the driving operation.

If, during a frontal impact, the front section of the vehicle is so deformed that the steering gear 2 is displaced toward the rear, then the joints 14 and 15 move into the position indicated by reference numerals 14' and 15'. The outer column 5 thereby pivots about the mounting means 16 without the steering wheel 4 itself carrying out a movement into the passenger space. It is assured thereby that the steering wheel 4 is not displaced into the area in which the driver of the vehicle will impinge in case of a serious frontal impact. Simultaneously it is achieved thereby that the steering wheel 4 is pivoted up to approximately the vertical so that it offers to the chest of the driver as large as possible an abutment surface, and does so in a favorable direction. The impact pot or deformation pot 9 disposed between the steering wheel 4 and the end of the steering spindle 3 therefore retains also during a serious accident its optimum effectiveness with utilization of the full deformation path.

The embodiment according to FIG. 8 corresponds in its basic construction to the embodiment according to FIG. 7. The mounting means 16, for example, in the form of a bracket, has in this embodiment a horizontal joint axis extending at a distance to the axis of the steering spindle 3 and disposed transversely to the driving direction. In order to achieve that the steering wheel 4 not only approaches the vertical in case of a serious accident but additionally also approaches the chest of the driver, so that an earlier impact is attained and a large deformation path is created thereby, a guide rail 17 is provided which is arranged above the joint 15. The joint 15 abuts at this rail 17, which has a somewhat flatter inclination than the portion of the steering spindle 3 adjoining the steering gear 2, after a short deflection of the steering column portion pivotal about the bracket 16. Thereafter, the joint 15 is guided along the guide rail 17 into the position 15' whereby a displacement in the vehicle longitudinal direction takes place. As a result thereof, also the steering wheel 4 is displaced into the position illustrated in dash line in which it is located closer to the chest of the driver.

Figure 9A:
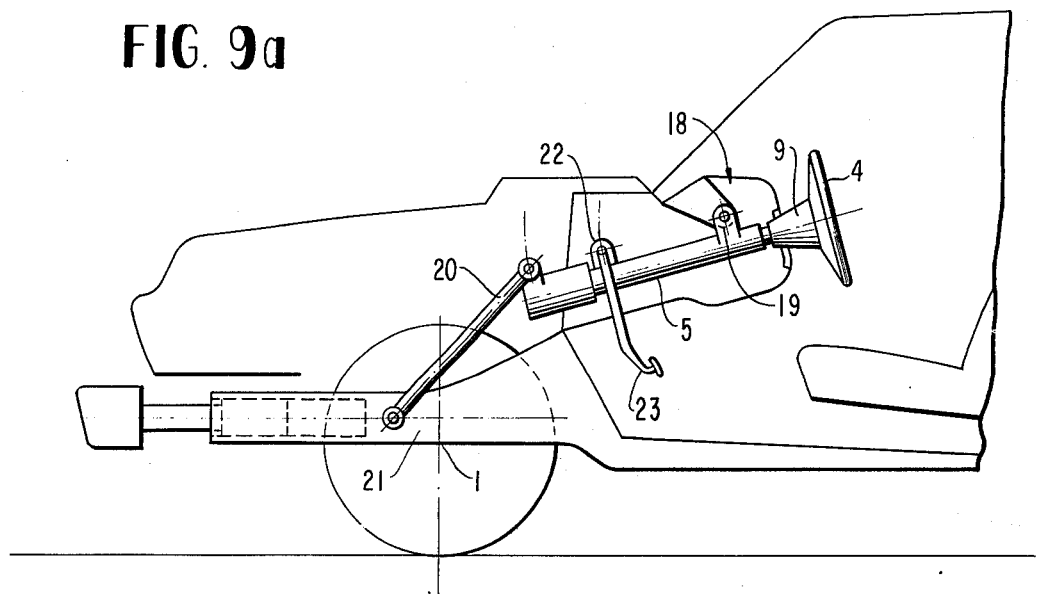
FIGS. 9a and 9b are schematic side elevational views of still another embodiment of a steering arrangement in accordance with the present invention in the normal condition and in the condition after a front impact, respectively.
Figure 9B:
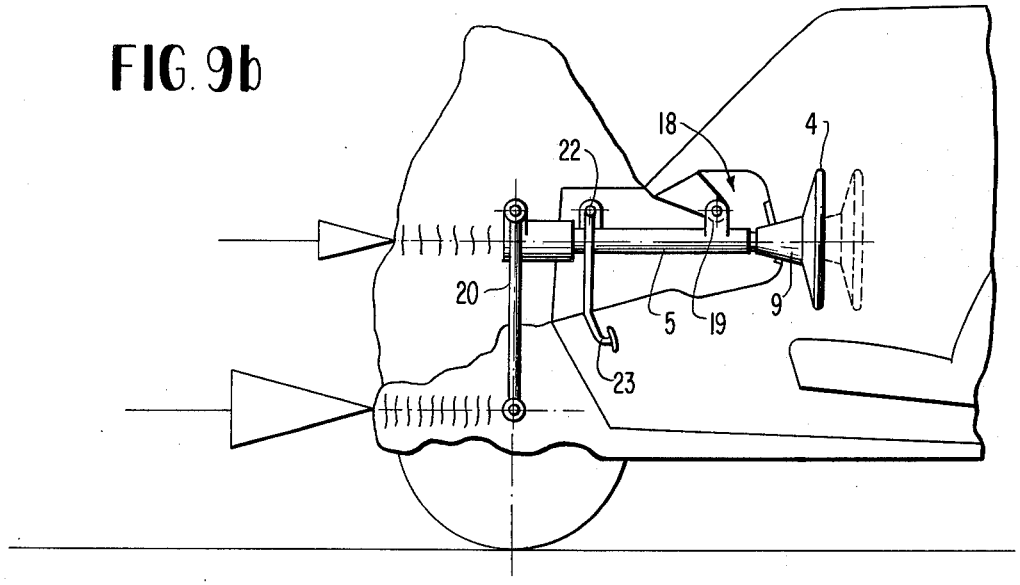

A motor vehicle equipped with a steering arrangement according to the present invention in its normal condition and after a serious accident is illustrated in FIGS. 9a and 9b, respectively. In this embodiment a steering spindle (not visible) is arranged on the inside of a short outer column 5 which is pivotally supported within the area of the instrument panel 18 by means of a mounting support 19 about a horizontal axis disposed transversely to the driving direction. The forward end of the slightly inclined outer column 5 is pivotally connected by way of a more steeply arranged rod or bar 20 at the longitudinal bearer 21 of the vehicle frame disposed in the area of the front axle 1. The connection of the rod 20 takes place in each case by way of a simple joint thereby forming an intermediate lever.

If with the vehicle illustrated in FIG. 9a the front portion thereof is so strongly deformed as the result of an accident, as is illustrated in FIG. 9b, then the rod 20 is erected into a vertical position. The outer column 5 together with the parts of the steering spindle guided therein and with the steering wheel 4 is thereby pivoted so far that it is transferred from the slightly inclined normal position into a horizontal position. The steering wheel 4 lies then in a vertical plane. Even if the obstacle impinges also within the area of the horizontal outer column 5 against the forward end thereof, the steering wheel 4 under certain circumstances is also axially displaced into the position illustrated in dash line in which it further approaches the chest of the driver so that an increased deformation path as well as a favorable impact position is available especially for a driver whose seat belt is not fastened.

In all embodiments of the present invention, it is achieved that the axial deformations in the base or floor area of a vehicle are transmitted onto the portion of the steering system disposed in the vehicle interior space essentially as pivot movements, by means of which the steering wheel 4 does not move out of the chest area of the driver but rather approaches more closely the vertical. Additionally, under certain circumstances, an axial displacement of the steering wheel and thus, in addition to an approaching of the steering wheel to the chest of the driver, also an impact direction more favorable from an angular point of view is obtained due to an intentional lowering.

Safety steering systems are produced with all embodiments of the present invention which absorb in an optimum manner the chest of a driver impinging against the steering wheel and absorb the same by way of a predetermined path. This is achieved by a. a controlled tilting of the plane of the steering wheel rim precisely or at least approximately into the vertical, b. a lowering of the center of the steering wheel rim which takes place simultaneously whereby either c. the steering wheel system carrying out the angular and height changes (steering wheel rim, spokes, hub and possibly impact pot) is displaced in a controlled manner in the direction toward the chest of the driver in order to be able to catch early especially a driver not fastened by means of safety belts and to be able to stop the driver over a long path, d. and/or the steering wheel system is so arranged that it is able to deflect in the forward direction by way of deformation pots, telescopes, parallelograms or similar guide elements.

As can be seen from FIGS. 9a and 9b, suspensions 22 for suspended pedals 23 are provided in this embodiment at the short outer column 5 which are pivoted away out of the area of the feet of the driver in case of a frontal impact.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A steering arrangement for a motor vehicle comprising:

steering column means having a portion which is pivotally mounted within the area of an instrument panel means, said steering column means being inclined in a given direction and having a steering wheel supported at an end thereof, at least one intermediate member supporting the steering column means within the area of a vehicle front axle, said member having a different inclination than the steering column means, and means for automatically positioning said steering wheel in a substantially vertical plane in front of an impinging body upon application of rearwardly directed deformation forces in said area of said front axle such that said intermediate member is moved rearwardly and upwardly wherein said steering column is pivoted to position said steering wheel in said vertical plane to optimize force dissipation of said impinging body on said steering wheel.

2. A steering arrangement according to claim 1, wherein said portion of the steering column means is of very short construction.

3. A steering arrangement according to claim 2, wherein said portion of the steering column means is constituted by an outer tubular member.

4. A steering arrangement according to claim 1, wherein said portion of the steering column means is constituted by an outer tubular member, and wherein said steering column means has a steering spindle.

5. A steering column arrangement according to claim 4, wherein the motor vehicle is a passenger motor vehicle.

6. A steering arrangement according to claim 4, wherein the outer tubular member is pivotally connected by way of an intermediate lever means at a support structure of the vehicle within the area of the front axle.

7. A steering arrangement according to claim 4, wherein the outer tubular member is secured at a relatively fixed vehicle part by a support means having a joint which has a substantially horizontal axis and is disposed transversely to the driving direction.

8. A steering arrangement according to claim 6, wherein the relatively fixed part is the instrument panel means.

9. A steering arrangement according to claim 4, further comprising a suspension means for pedals provided at the outer tubular member.

10. A steering arrangement according to claim 4, wherein the outer tubular member is secured at a relatively fixed vehicle part by a support means having a joint which has a substantially horizontal axis and is disposed transversely to the driving direction.

11. A steering arrangement according to claim 10, wherein a suspension means for pedals is provided at the outer tubular member.

12. A steering arrangement according to claim 10, wherein said intermediate member being formed by a non-guided deformation means is arranged between an upper portion of the steering spindle carrying a steering wheel and a forwardly disposed lower portion, said deformation means having in a zero position of the steering wheel a more steep inclination than the steering column axis.

13. A steering arrangement according to claim 10, wherein the steering spindle is subdivided by joint means, the portions of the steering spindle being disposed one behind the other substantially in the driving direction and only the upper portion carrying a steering wheel being guided in the outer tubular member.

14. A steering arrangement according to claim 11, wherein a guide rail means is arranged above the joint means of the portion of the steering spindle guided in the outer tubular member, said guide rail means having a lesser inclination than the portion of the steering spindle disposed outside of the outer tubular member.

15. A steering arrangement according to claim 10, wherein the outer tubular member is pivotally connected by way of an intermediate lever means at a support structure of the vehicle within the area of the front axle.

16. A steering arrangement according to claim 15, wherein a suspension means for pedals is provided at the outer tubular member.

17. A steering arrangement according to claim 10, wherein the relatively fixed part is the instrument panel means.

18. A steering arrangement according to claim 1, wherein said intermediate member being formed by a non-guided deformation means is arranged between an upper portion of a steering spindle of the column means carrying the steering wheel and a forwardly disposed lower portion, said deformation means having in a zero position of the steering wheel a more steep inclination than the steering column axis.

19. A steering arrangement according to claim 1, wherein a steering spindle part of the column means is subdivided by joint means, the portions of the steering spindle being disposed one behind the other substantially in the driving direction and only the upper portion carrying the steering wheel being guided in an outer tubular member.

20. A steering arrangement according to claim 6, characterized in that a guide rail means is arranged above the joint means of the portion of the steering spindle guided in the outer tubular member, said guide rail means having a lesser inclination than the portion of the steering spindle disposed outside of the outer tubular member.

21. A steering arrangement according to claim 1, wherein the steering column means is non-adjustable.

22. A steering arrangement according to claim 1, wherein the steering wheel is non-adjustable.

23. A steering arrangement according to claim 1, wherein the steering column is arranged at a fixed angle with respect to the panel means.

24. A steering arrangement according to claim 1, wherein the intermediate member is more steeply inclined than the steering column means.

25. A steering arrangement according to claim 1, wherein the steering column means and the intermediate member are so arranged that said movement of the steering wheel plane toward a substantially vertical position is assured at every instant of normal driving.

* * * * *